United States Patent
Yang et al.

(10) Patent No.: US 7,107,694 B2
(45) Date of Patent: Sep. 19, 2006

(54) METHOD FOR OBSERVATION OF MICROSTRUCTURAL SURFACE FEATURES IN HETEROGENEOUS MATERIALS

(75) Inventors: Dehua Yang, Savage, MN (US); Thomas J. Wyrobek, Edina, MN (US)

(73) Assignee: Hysitron, Incorporated, Minneapolis, MN (US)

(*) Notice: Subject to any disclaimer, the term of this patent is extended or adjusted under 35 U.S.C. 154(b) by 68 days.

(21) Appl. No.: 10/881,302

(22) Filed: Jun. 29, 2004

(65) Prior Publication Data

US 2005/0283985 A1 Dec. 29, 2005

(51) Int. Cl.
*B43L 13/00* (2006.01)
*G01B 5/20* (2006.01)
*G01B 5/28* (2006.01)

(52) U.S. Cl. .............................. 33/18.1; 33/553; 73/105
(58) Field of Classification Search ................ 33/18.1, 33/DIG. 2, 551, 553, 554, 555, 1 BB; 73/105; 83/879–887
See application file for complete search history.

(56) References Cited

U.S. PATENT DOCUMENTS

| | | | |
|---|---|---|---|
| 2,715,830 A * | 8/1955 | Lewis et al. ................. 73/1.89 |
| 3,728,980 A * | 4/1973 | Fraze ........................... 72/325 |
| 5,150,598 A * | 9/1992 | Uchida et al. ................ 72/325 |
| RE34,489 E | 12/1993 | Hansma et al. .............. 250/560 |
| 5,327,625 A * | 7/1994 | Clark et al. ................. 29/25.01 |
| 5,450,746 A | 9/1995 | Howard ....................... 73/105 |
| 5,512,808 A * | 4/1996 | Clark et al. ................. 318/575 |
| 5,553,486 A | 9/1996 | Bonin ......................... 73/105 |
| 5,576,483 A | 11/1996 | Bonin ......................... 73/105 |
| 5,818,605 A * | 10/1998 | Crewe et al. .............. 358/3.29 |
| 5,866,807 A | 2/1999 | Elings et al. ............... 73/105 |
| 5,965,896 A | 10/1999 | Marton ...................... 250/559.4 |
| 6,026,677 A * | 2/2000 | Bonin ......................... 73/105 |
| 6,499,340 B1 * | 12/2002 | Yasutake et al. ............ 73/105 |
| 6,823,723 B1 * | 11/2004 | Vandervorst et al. ......... 73/105 |
| 6,945,097 B1 * | 9/2005 | Jardret et al. ................. 73/81 |
| 2003/0140684 A1 * | 7/2003 | Broz et al. ..................... 73/81 |

OTHER PUBLICATIONS

*A Cost-Effective AFM Analysis Project: Comparative Study of the Morphology & Microstructure of Etched Zirconia & Alumina* by Carolos Alonzo & Steve Pratt, Eastman Kodak; Ray Eby, Copyright 2002 Veeco Instruments Inc.

*Music of the Spheres at the Atomic Scale* by Alex de Lozanne, Published Jul. 16, 2004, in Science, pp. 348-384, vol. 305.

*Quantitative imaging of nanoscale mechanical properties using hybrid nanoindentation and force modulation* by S.A. Syed Asif, K. J. Wahl[a)], R.J. Colton, and O. L. Warren, Published Aug. 1, 2001, in Journal of Applied Physics, pp. 1192-1200, vol. 90, No. 3.

* cited by examiner

*Primary Examiner*—Diego Gutierrez
*Assistant Examiner*—Amy R. Cohen
(74) *Attorney, Agent, or Firm*—Nawrocki, Rooney & Sivertson, P.A.

(57) ABSTRACT

A method for forming a topographical image of the heterogeneous variations in a surface of a material has a first machining step and a second scanning step. The preferred machining step uses a preselected scribing tool to scribe a plurality of adjacent grooves in a selected material surface at a preselected constant force. This machining step produces a machined surface whose local elevations relative to a datum plane are dependent on the local hardness or wear resistance of the surface. Then the scanning step shifts the scribing tool across the surface in contact with the surface, and measures the elevation of the tool at a plurality of selected surface coordinates. The measured elevations allow formation of a topological map depicting sub-micron structural features of the surface.

21 Claims, 3 Drawing Sheets

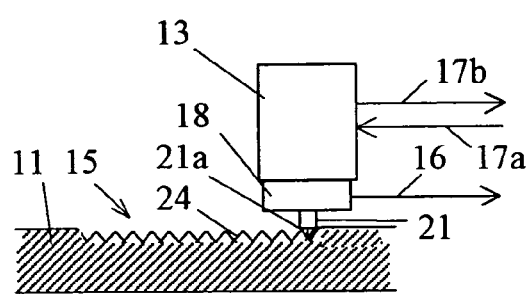
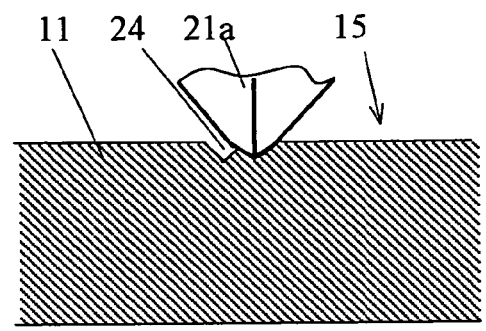
Fig. 4
Fig. 5
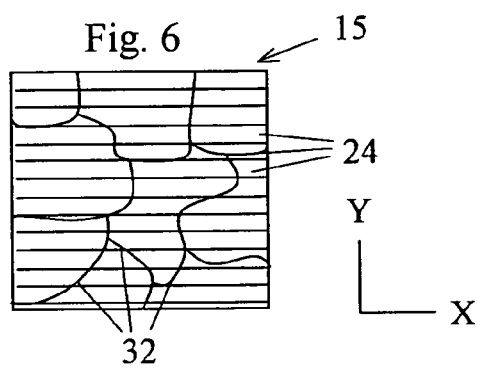
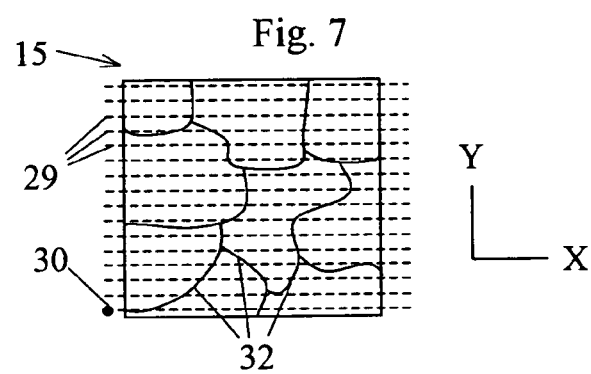
Fig. 6
Fig. 7

METHOD FOR OBSERVATION OF MICROSTRUCTURAL SURFACE FEATURES IN HETEROGENEOUS MATERIALS

BACKGROUND OF THE INVENTION

Many types of devices for proper functioning depend on specialized characteristics of the materials from which the devices are made. Steel must be strong enough and hard enough to serve as a good drill bit material. A bearing material must be made of a material that is adequately hard and yet machinable to adequate smoothness. Electrical wire must have adequate conductive and ductility characteristics. The list is endless.

One particular set of characteristics that is often important in testing materials is the submicroscopic, or nanometer structure. In particular, designs of various types of devices depend on the submicroscopic surface structure of materials from which the devices are made. One example is in computer hard drives, where these characteristics of both the individual disks and the heads that read and write the data affect the allowable bit density and the bearing characteristics of the head and disk surfaces.

A number of devices now have the ability to measure various mechanical characteristics of a material surface on the nanometer level. For example, an atomic force microscope (AFM) or a scanning probe microscope (SPM) can perform scratch, indent, and wear tests using a tool such as a small stylus having a hard, typically diamond, tip. SPMs and AFMs typically use an actuator capable of precise positioning of a tool mounted on any of them. Such actuators will be referred to generally hereafter as precision positioners.

Revealing the near-surface internal structure of many types of engineering materials on a submicroscopic level is often very useful. The internal structure of interest may be the crystal grain shapes, orientations, boundaries and distributions; concentration of contaminants; inclusions; voids; or other features. One example of such conventional devices is disclosed in U.S. Pat. No. 5,866,807.

This has been done in the past by a process that relies in part on precision positioner imaging. The first step in this process is to highly polish the surface. Then lightly etching the material surface with an appropriate etchant alters the surface topography in a way that reveals internal structure. This surface topography may be very small and detailed, and quite impossible to see with a conventional optical microscope. Then a precision positioner is used to obtain data values from which an image of the surface topography can be formed. This image provides an indication of the material's internal structure.

Conventionally, force and motion oriented in the plane of a workpiece surface can be defined by reference to orthogonal X and Y-axes parallel to the nominal surface of the workpiece. A Z-axis normal to the X and Y-axes thus defines force and motion vectors normal to the nominal surface of the workpiece.

A precision positioner commonly has a three axis piezoelectric element that can precisely move a mounted tool along the X Y, and Z-axes under control of a positioning signal, and accurately measure the coordinates of the tool at any time. By forcing the tool toward the workpiece surface along the Z-axis, the precision positioner can cause the tool to scribe or dent the surface. Force measurements during such machining activity or analysis of the machined surface thereafter allow one to accurately determine material characteristics such as hardness and wear resistance. The commonly available precision positioners have ample force available to perform the scribing or denting required by the invention.

Precision positioners can accept and manipulate various types of auxiliary attachments. One type of auxiliary attachment that can be mounted on a precision positioner is a type of force transducer called a nanoindenter. A nanoindenter allows a tool carried by the nanoindenter to be pressed against the workpiece surface with an exact amount of force.

A nanoindenter typically carries as its tool, a small diamond-tipped stylus that the nanoindenter can use to scribe or dent a workpiece surface. This invention most often uses a nanoindenter carrying a stylus or tool having a conical or pyramidal tip with an effective radius of curvature ranging from 30 to 1000 nanometers (nm). Nanoindenters can be calibrated to accurately provide Z-axis force ranging from 100 nanonewton (nN) to perhaps 30 millinewton (mN).

An enterprise named Hysitron located in Eden Prairie, Minn. makes a version of a nanoindenter preferred for this invention. The Hysitron nanoindenter has a structure explained in U.S. Pat. Nos. 5,553,486 and 5,576,483.

The Hysitron nanoindenter carries the tool on a special spring. The Hysitron nanoindenter spring allows the tool to translate along the Z axis, and very strongly resists translation and rotation in the other five degrees of freedom. When the precision positioner forces the tool into a workpiece surface, the spring is deflected.

The Hysitron nanoindenter can operate in two modes, precise Z-axis positioning and precise measurement of Z-axis force. The latter function is of particular interest for this invention. In force measurement mode, the Hysitron nanoindenter provides a tip force signal indicating the Z-axis force that the tool tip applies to the workpiece surface. The Hysitron nanoindenter measures force from the deflection of the internal spring. The amount of spring deflection precisely indicates the Z-axis force currently applied to the tool.

The Hysitron nanoindenter includes components that allow the spring deflection to be measured. The moving element of the Hysitron spring carries a plate whose spacing from adjacent control surfaces can be precisely determined using changes in capacitance between the plate and adjacent control surfaces to alter an AC signal applied between the plate and the control surfaces. The technical aspects of measuring spring deflection are explained in the previously identified U.S. Pats.

A Hysitron nanoindenter can provide and measure a wide range of tip forces, from a large force that causes the tool tip to penetrate relatively deeply into a particular workpiece, to a low force that penetrates into the workpiece very little, if any.

FIG. 1 shows a conventional nanoindenter test unit 1 of which a precision positioner 13 forms a part. Test unit 1 has a frame 10 having a central opening in which the various elements of test unit 1 are mounted. Precision positioner 13 is mounted in the central opening above a stage or table 22 on which a workpiece 11 is mounted. Frame 10 has extreme rigidity and a large mass to prevent vibration and movement of frame 10 that may affect the accuracy with which positioner 13 is supported above stage 22. Positioner 13 carries a transducer 18 attachment having a tool tip 21 adjacent to a surface on workpiece 11 to be tested.

Precision positioner 13 is shown separately from frame 10 in FIG. 2. Preferably, transducer 18 is a nanoindenter of the type available from Hysitron mentioned earlier. Tool 21 has a tip 21 a that typically is formed of diamond having, as previously mentioned, a radius of curvature ranging from 30 to 1000 nanometers (nm). The tip 21a usually has a conical or a three or four-sided pyramidal shape.

A preferred type of positioner 13 comprises a piezoscanner unit for precision X, Y, and Z-axis positioning of nanoindenter 18 and the attached tool 21. Such a positioner 13 can, under the control of a tool positioning signal carried on signal path 17a, shift tool 21 with a precision on the order of nanometers to any desired X, Y, and Z-coordinates within the range of movement of positioner 13. Positioner 13 provides a tip coordinate signal on path 17b that specifies with excellent accuracy the current X, Y, and Z coordinates of tip 21a relative to some origin.

Transducer 18 provides a tip force signal on path 16. The tip force signal precisely specifies the force applied along the Z-axis to the tip 21a by the workpiece 11 surface. As previously mentioned, this force can be inferred from the amount of spring deflection experienced by transducer 18 along the Z-axis since the relationship between force and deflection of the spring along the Z-axis can be determined with high accuracy.

Controller 20 further provides the positioning signal to positioner 13 on path 17a. The positioning signal directs positioner 13 to move tool tip 21a to a specified set of X, Y, and Z coordinates. Thus, by holding say the Y and Z coordinates constant and changing the X coordinate incrementally, controller 20 can cause precision positioner 13 to shift tool tip 21a along a line parallel to the X-axis.

A stage actuator 19 carries stage 22. Actuator 19 can move stage 22 through at least several cm in the X, Y, and Z-axes for gross positioning of workpiece 11, and then lock at a desired position. Often, controller 20 operates actuator 19 when positioning stage 22. Controller 20 uses positioner 13 for precisely positioning the tool tip 21a carried by the transducer 18 at the X and Y coordinates specified by the positioning signal.

BRIEF DESCRIPTION OF THE INVENTION

We have developed a new method for exposing and imaging the near surface submicroscopic structure of materials having small heterogeneous features. This method substantially improves the speed with which the image is formed compared with the traditional metallurgical approaches using an optical microscope, scanning electron microscope, transmission electron microscope or AFM.

For many applications, this new method creates an image that reveals features that are unavailable with other methods and processes. The new method requires less equipment and less time and procedures to form the image and to create the image of the microstructural features of a test surface.

Such a method for creating an image of the internal structural features for a selected area of a solid material sample comprises a first step of selecting a machining tool having a tip with a preselected radius of curvature smaller than a selected dimension of the expected structural features. This normally means that the tool tip will have an effective radius of curvature in the tens or hundreds of nanometers. We prefer to mount the selected machining tool on a transducer such as the Hysitron nanoindenter that can be used to maintain constant Z axis force on the tool tip. The transducer is mounted on a precision positioner such as a piezoscanner. The precision positioner is of the type that can move the tool tip to desired X, Y, and Z positions on the test surface to be analyzed.

The selected machining tool then is used to scribe or machine a plurality of lines over the selected area with a preselected constant Z-axis scribing force. The transducer can be used in a closed loop system to hold the tool Z-axis scribing force to the preselected value. This Z-axis scribing force should be held reasonably constant, so that softer or less wear-resistant parts of the selected area are scribed more deeply than are harder or more wear resistant parts of the selected area.

The amount of Z-axis force is very small, typically in the tens of micronewtons ($\mu$N) for common engineering materials, but depends greatly on the hardness of the test surface. Preferably the lines are scribed parallel to and close to each other. Most often, such lines should overlap so that nearly all of the variations in topography over the machined surface arise from differences in the surface hardness or wear-resistance rather than from ridges between adjacent scribed lines. Several passes over the test surface may be needed to fully reveal the near-surface structural features.

Then the precision positioner scans the selected machining tool tip across the test surface using a scanning force substantially smaller than the scribing force, perhaps smaller by as much as one to two orders of magnitude. This force must be adequate to hold the tool tip against the test surface at all times. Again, the transducer is used with closed loop control to maintain constant Z-axis force. The tool tip is scanned along closely spaced linear paths. The tool tip distance from the Z-axis datum plane is sampled at a frequency that allows for creating a relief map of the test surface's topographical features.

As the tool tip is scanned across the test surface, the precision positioner provides a signal indicative of the Z-axis (vertical) tip displacement relative to a preselected Z-axis datum plane for each of numerous pairs of horizontal (X and Y) tip position coordinates within the selected test area. A tip displacement table is formed of each set of related X, Y and Z coordinates. When a Hysitron nanoindenter is used as the transducer, the Z-axis force must be held relatively constant to assure a constant spacing between the precision positioner and the very end of the tool tip.

The values in this table are then used to generate an image of Z-axis (vertical) tip displacement at the scanned horizontal tip positions on the selected area. In one preferred embodiment, the values in the table are used to form a pixel map or relief pattern indicating variations in Z-axis tool tip displacement. Tool tip displacement closely follows the topography of the machined test surface.

We have found that using the tool with constant force to scribe or otherwise machine the surface area to be imaged creates a topography on that surface providing a surprisingly good indication of the near-surface hardness or wear-resistance variations of each phase, component, or domain within the machined surface of the material. The topographical variations formed by constant force machining closely follow the variations in hardness and wear resistance of the material surface at a submicron scale.

Then using the same tool to scan across the material surface with a substantially reduced force readily and conveniently provides much useful structural information about the overall material properties. That is, the combination of relatively high, constant force machining and low, constant force scanning offers a new method of observing microstructural features without altering the crystal lattice, grain or other submicron molecular structures in the test surface. The ability to use the same system with the same tool for both machining and scanning substantially reduces the testing time and equipment requirement.

BRIEF DESCRIPTION OF THE DRAWINGS

FIG. 4 is a magnified cross section of a sample area after machining.

FIG. 5 shows a further magnified cross section view of a single scribe line.

FIG. 6 shows a plan view of a set of typical machining paths by a tool tip, with only the peaks thereof indicated with solid lines.

FIG. 7 shows a plan view of a set of typical scan paths for generating an image of the topography produced by the previous machining step.

DESCRIPTION OF THE PREFERRED EMBODIMENTS

Figure 1:
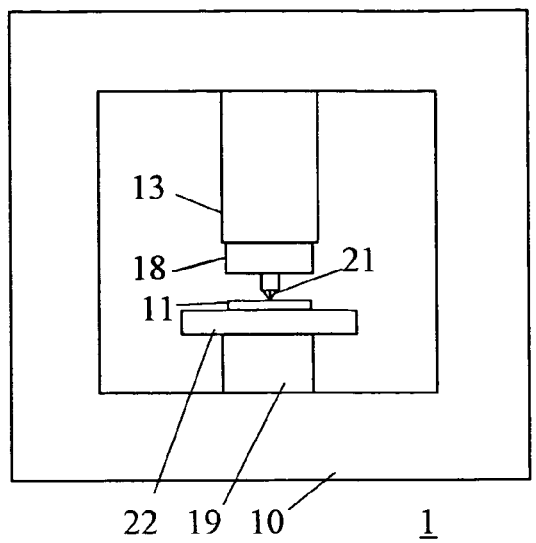
FIG. 1 is a sketch view of a Hysitron nanoindenter system.
Figure 2:
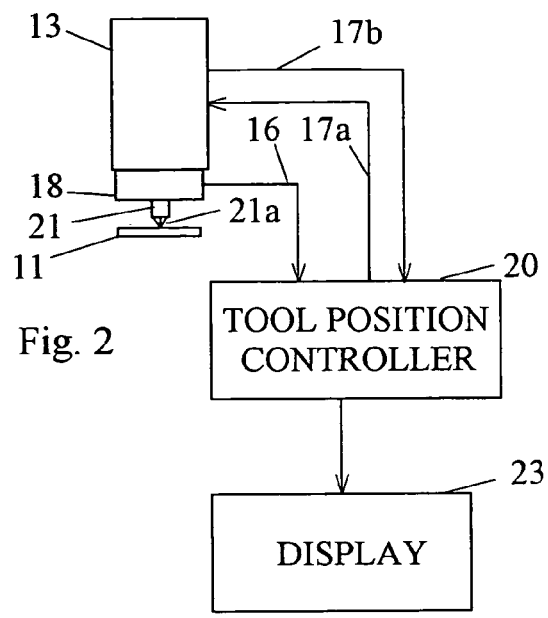
FIG. 2 is a sketch view of a precision positioner forming a part of a nanoindenter
Figure 3:
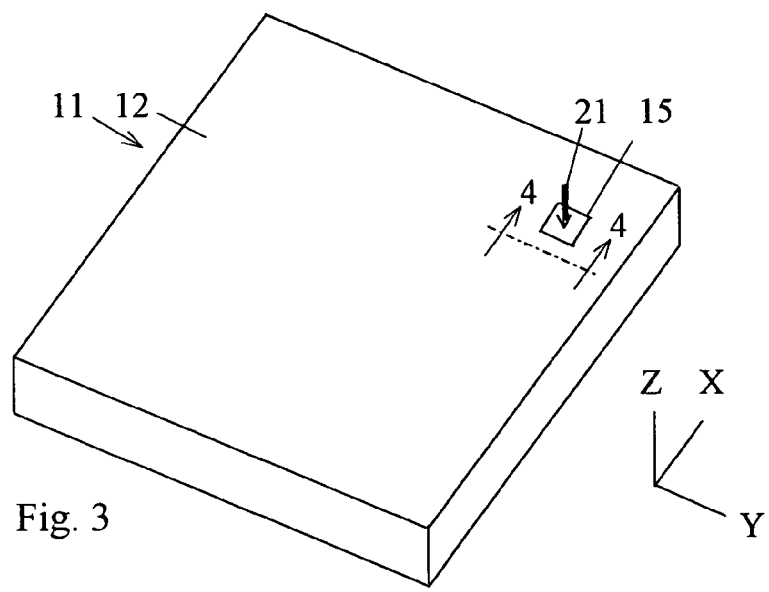
FIG. 3 shows a typical material sample with an area to be machined and imaged.

The method of the invention forms an image of variations in microstructural properties reflected as hardness or wear resistance at the nanometer level for a material sample 11 such as shown in FIG. 3. Sample 11 may comprises any of a wide variety of metals, ceramics, biological materials, plastics, coatings, or amorphous materials with heterogeneous small features. Of course, parameters used in implementing the method of the invention depend on the type of material comprising sample 11.

Sample 11 has a test surface 12 in which a sample area 15 is selected. Sample area 15 may be approximately square with a side whose length is in the approximate range of 50 nm to 80 microns (μm), with 10 μm a typical length.

Tool 21 is shown positioned within sample area 15. Precision positioner 13 carries tool 21 as previously described. Tool 21 will normally be approximately positioned within area 15 by movement of stage 22. Stage 22 may be shifted either under manual control, or by controller 20. Once sample area 15 is positioned under tool 21, precision positioner 13 can then shift the position of tool 21 to any desired X and Y coordinates within sample area 15.

An image that maps surface submicron structural properties can be formed using a multi-step method. Initially the operator chooses a suitable tool 21a and mounts tool 21 on transducer 18. The tool tip 21a radius must be compatible with the type of material comprising sample 11. A softer material often requires a larger tip radius, although very small features to be resolved may require a smaller tip 21a radius.

The sample area must then be polished or otherwise prepared for testing. The type of preparation for sample area 15 should not affect the subsurface features to be revealed. We usually prefer that the maximum variation from peaks to valleys in sample area 15 be around 1 μm. The surface preparation need only provide the required smoothness in sub-micron localities. Since sample area 15 is very small, many times an existing peak or valley may be used as the site of sample area 15. Even if the features to be revealed during the machining step are very small, such small areas are still many times larger than the features to be resolved.

Sample 11 is then mounted on stage 22. Controller 20 or the operator then shifts stage 22 to place sample area 15 under tool 21 and shifts stage 22 along the Z-axis to place sample area 15 very close to tool tip 21a.

The next two steps rely on accurate control of tip 21a force against sample area 15. Controller 20 uses the tip force signal on path 16 to operate in a closed loop mode in controlling the Z-axis force that transducer 18 applies through tip 21a against sample area 15. By adjusting the tip position signal on path 17a to shift a transducer 18 such as the Hysitron nanoindenter along the Z-axis closer to or further from sample area 15, controller 20 causes measured tip 21a force to closely match the force value selected for tip 21a. Controller 20 may use a control algorithm such as the PID (proportional-integral-differential) algorithm to hold tip 21a force close to the desired value. Accurate control of Z-axis force is known to be easily available using the Hysitron nanoindenter.

The Hysitron nanoindenter is particularly suitable for this invention because it can accurately measure a wide range of forces which tool tip 21 applies against sample area 15. Typical control loops used by controller 20 can maintain any selected force over five orders of magnitude with great accuracy by adjusting the Z-axis position of a Hysitron nanoindenter. A typical Z-axis force range available may be 1 to 100 micronewtons (μN). The Hysitron nanoindenter also can apply precisely vertical force, which is desirable for this application.

The next step of the method comprises machining the sample area 15 using tool 21 to scribe a series of adjacent grooves 24 into sample area 15 at a relatively high, constant tip 21a Z-axis force. FIGS. 4–6 help explain the machining step. FIG. 4 shows a substantially magnified cross section of a portion of sample 11 in the vicinity of sample area 15. A number of side-by-side grooves 24 have been scribed by tool 21.

FIG. 5 shows a further enlarged view of a completed groove 24 formed by material removed by a previously scribed line. Tool tip 21a is shown forming a second groove 24. We prefer to overlap adjacent grooves 24 by as much as 85–90% of the tip 21a radius to limit tooling marks on sample area 15 resulting from the curvature of tool tip 21a.

Controller 20 directs precision positioner 13 to shift tool tip 21a along a path parallel to the X-axis to successively form each of these grooves 24. After a particular groove 24 has been formed controller 20 incrementally shifts tool 21 to the next Y coordinate to form the next groove 24. FIG. 5 does not show variations in depth along a groove 24 and from groove to groove resulting from variations in wear resistance and hardness within sample area 15, but these variations are present after machining.

Controller 20 uses the closed loop system to maintain the selected Z-axis force. Controller 20 constantly reads the tip 21a force encoded in the tool force signal on path 16 and compares the force indicated with the selected force. The Z-axis position of transducer 18 is adjusted as needed by controller 20 to maintain the selected force. We find that maintaining machining force within about 1–2% of the selected force is adequate for most samples 11. Some types of machining steps may be adequate with substantially less accuracy, perhaps in the range of ±30% or more.

In many situations, a preferred machining step includes a number of passes over the entire sample area 15. Increasing the number of passes allows lower Z-axis force, reducing changes in the near-surface structural or chemical properties induced by the machining method itself, but increasing the machining time.

FIG. 6 is a plan view of a series of these grooves 24 formed with a single pass, although of course a number of passes may be desirable. Pattern 32 is revealed by the machining step and represents one representative set of variations in the topographic elevation across sample area 15 as a result of the machining step.

Of course, the variations in wear resistance and hardness representing a variety of microstructural features can take any number of different forms and patterns. For example, a crystal grain structure may have a very regular geometric wear-resistance pattern 32. An amorphous material may have a more random, even a fractal, form of a wear-resistance pattern.

The variations in the topographic elevation revealed by the formation of these grooves 24 are extremely small, typically on the order of 10–20% of the groove depth. Tip 21a force and radius of curvature is selected to provide a detectable difference in the topographic elevation from point to point across sample area 15 after the machining step is complete. These differences in elevation are directly related to hardness and wear resistance across the surface of the material in sample area 15.

In some cases, as many as 500 passes across the entire sample area 15 may be desirable, although 10 to 50 passes is more common. The groove 24 spacing may range from 0.2 nm to 600+ nm. Z-axis force applied to tool 21 by transducer 18 during the machining or scribing step may range from 100 nN to 30 millinewton (mN), with 50 to 100 μN typical.

We strongly prefer that adjacent grooves 24 overlap during the machining in order to minimize Z-axis height variations arising from furrows created between adjacent grooves 24. The Y-axis movement of tool 21 as precision positioner 13 moves tool tip 21a from one groove 24 path to the next can be controlled to less than the embedded width of tool tip 21a to produce an effective overlap of adjacent grooves 24 during consecutive passes. Most precision positioners 13 have more than adequate X and Y-axis accuracy and position control even when subjected to deflecting force arising from the machining operation to assure that tool 21 accurately forms the individual grooves 24.

The machining step of the method typically scribe individual grooves 24 at the rate of 0.1 to 2 grooves per second. A typical sample area 15 has a square shape whose side is around 10–40 μm. These dimensions yield an actual velocity of tool 21 in the range of 1–80 μm/sec. not counting reversing and positioning times which comprise a small percentage of the total time. If tool tip 21a in such tests has a tip radius of 100 nm, the width of the test area is 10 μm, and the grooves 24 are spaced apart by 20% of the tip radius, then one machining pass comprises 500 grooves, a value fitting within a 9 bit register.

The total time for one pass ranges from about 4 to 80 minutes. Thus 10 passes would require about 40–800 minutes. Although these are substantial times, the fact that no human intervention is required allows one operator to supervise a number of simultaneous tests. We find the method produces consistent results for adjacent sample areas.

Preferred ranges of Z-axis force on tool 21 during the machining passes produce relatively shallow grooves 24 that alter the submicroscopic structural and chemical characteristics of the sample 11 material surface very little if at all other than for the removed material. After the machining step or steps are complete, the less wear-resistant details of area 15 are scribed more deeply than are the more wear-resistant details, with pattern 32 of FIG. 6 showing one possible image. In essence, the machining process reveals near-surface structural features within sample area 15 without substantially altering the underlying structure.

Where the designated sample area 15 is relatively rough, it is possible to use a preselected higher Z-axis force during a first phase of the machining step comprising at least one machining pass to somewhat smooth sample area 15. A second phase of the machining step then follows comprising at least one machining pass with lower Z-axis force over sample area 15. The second step reveals the microstructure.

The first phase of the machining step may comprise one or more passes using the preselected first force. The second phase may comprise one or more passes using a preselected second force no larger than about 25% of the preselected first force. Or the second phase may comprise at least one pass using a preselected second force of about 10% of the preselected first force. For example, if the first few machining passes use Z-axis force of 1000 μN, then several passes at 100 μN may follow.

After the machining step is complete, typical peak-to-valley variations in Z-axis height range from a few nm to perhaps as much as a μm. The operator selects machining parameters to optimize the peak-to-valley variations without substantially altering the features to be imaged. This is easy for those familiar with nanoindenter technology.

After the machining step is complete, scanning or imaging step uses the same tool 21 used in the machining step to form an image or relief map of the topographic elevation changes across sample area 15. The typical devices such as piezoscanners used as precision positioner 13 provide position information in a tip coordinate signal on path 17b. The accuracy with which position can be signaled is as good as 10 nm in the X and Y-axes and 5 nm in the Z-axis direction for typical piezoscanners, which is fully adequate for this application.

FIG. 7 shows a number of adjacent X-axis paths 29 that tool 21 may trace on sample area 15 during scanning. At closely spaced points along each scan path 29, the topographic elevation is sensed. Controller 20 receives the measures and records Z-axis position of tip 21a relative to an arbitrary or imaginary datum plane, and the X and Y coordinates at that point. Point 30 indicates an origin point for the X and Y coordinates. Typically, only one scanning pass is necessary. The scanning pattern shown is only one of many different possibilities.

The distance between scan paths 29 and the distance between scan sampling points on each path 29 should be approximately equal. In general, these distances should be approximately half of the smallest topographic feature to be resolved or smaller. The tool tip 21a effective radius of curvature may be approximately the same size as the smallest topographic feature to be imaged or revealed, although the geometry of the situation may sometimes allow features or elevation variations over a smaller X-Y distance to be satisfactorily resolved.

During the scanning step, controller 20 holds the Z-axis force on tool 21 constant at a level substantially less than during the machining step, but greater than zero. In many instances, scanning is done with tool 21 Z-axis force between 1 and 10% of the machining force, with 2% being common. The ability of controller 20 to control tool 21 Z-axis force very accurately across two or more magnitudes of force is important when using the same tool 21 for both machining and imaging.

Using a Hysitron nanoindenter with the transducer 18 in a closed Z-axis control loop during scanning makes accurate tip 21a Z-axis force control relatively easy. Constant Z-axis force is required to maintain constant deflection of the spring. Without constant spring deflection, the position of tool tip 21a relative to a datum point on precision positioner 13 varies. Such variations reduce the accuracy of the Z-axis position value supplied by the precision positioner 13. Even with the relatively light Z-axis force used during scanning, closed loop control of Z-axis force using the tip force signal on path 16 from transducer 18 provides accurate control of Z-axis force on tool 21.

Using the same components in test unit 1 for both machining and scanning is advantageous since the imaging step can directly follow the machining step without operator intervention. Alternative ways of machining surface 12, say chemically or with a different machining tool 21 usually add substantial time to the process.

After the imaging step is complete, the recorded information from this step may be used to form an image. During imaging, each of the individual X and Y coordinate pairs from the sample area 15 to pixel positions in a greatly enlarged picture of the image formed in display 23. Thus, each pixel correlates with one of the X and Y coordinate pairs. The pixel is then filled with a gray scale intensity corresponding to the topographic elevation in sample area 15 measured at the X and Y coordinates correlating to that pixel. Thus, a topographical or relief map is formed that displays the topographic elevation across the entire image of sample area 15. This map provides a visual representation of the elevations formed by the machining step.

On the other hand, sometimes, no image need be formed. For example, statistical analysis of variations in the depth of the machined surface area 15 may be all that is required. The individual changes in surface topography allow such analysis without forming an image.

The map or image formed by this process appears very similar to the images shown in FIGS. 6 and 7, but without the grooves 24 or indicated scan paths 29. This image often reveals many important characteristics of material sample 11.

Figure 8:
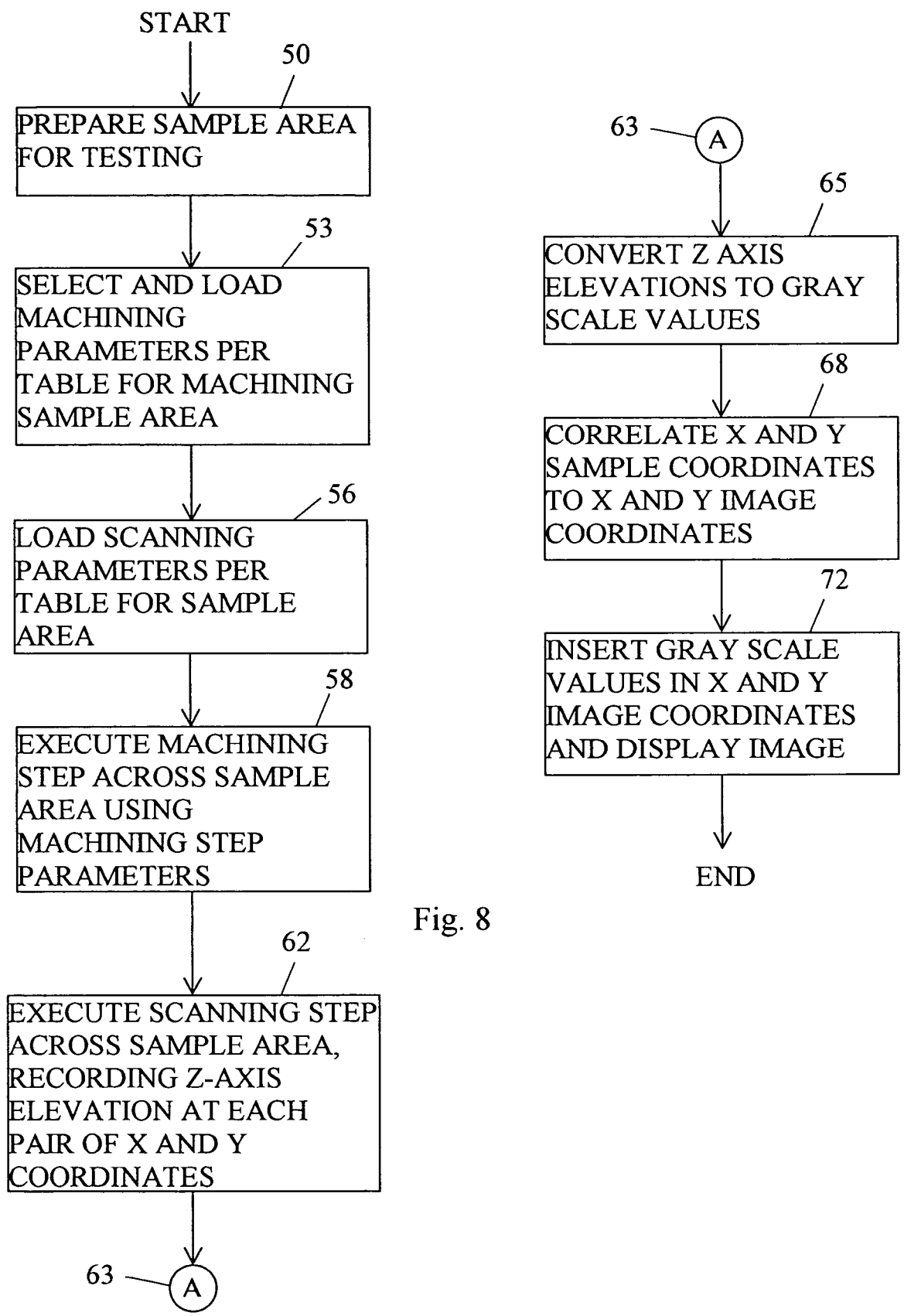
FIG. 8 is a flow chart of software that a personal computer can execute in controlling a nanoindenter test unit to perform the steps of the invention.

To provide concrete support for the practice of this invention, FIG. 8 is a process chart for the method steps of the invention. Step 50 involves preliminary machining to prepare sample area 15 for testing and is usually done under human control.

In step 53 an operator selects machining step parameters, usually within the ranges specified in the Machining Parameters table, and loads them into controller 20.

Machining Parameters Table

| Parameter | Range | Typical | Units |
|---|---|---|---|
| Tool Z-axis force | 100 nN–30 mN | 50–100 µN | force |
| Z-axis force error | <30% or more | 1–2% | |
| Path rate* | 0.1–3 | 1 | Hz |
| Groove depth | 5–50 | 10–30 | nm |
| Grooves per pass | 100–1000 | | |
| Path spacing | 0.2–625 | 20 | nm |
| Number of passes | 1–500 | 10–50 | |
| Path length | 50–80,000 | 10,000 | nm |
| Sample area width | 50–80,000 | 10,000 | nm |
| Tip radius | 30–1000 | 50 | nm |

*Path rate is the number of grooves scribed per sec.

These ranges may not be suitable for all types of samples 11, and are simply the best values now known. Given the vast number of different materials that may be tested, it is extremely unlikely that the Machining Parameters table provides parameters suitable for every material that exists. It does, however, provide values that are suitable for a substantial number of materials.

In step 56 an operator selects scanning step parameters, usually within the ranges specified in the Scanning Parameters table and loads them into controller 20.

Scanning Parameters Table

| Parameter | Range | Typical | Units |
|---|---|---|---|
| Tool Z axis force | 0.1–5 | 1 | µN |
| Path rate | 1–3 | 1 | Hz |
| Path spacing | 2–500 | 20–100 | nm |
| Sample-to-sample spacing | Similar to path spacing chosen | | |
| Number of passes | 1 | | |

These ranges too may not be suitable for all types of samples 11, and are simple the best values now known. Given the vast number of different materials that may be tested, it is extremely unlikely that the Scanning Parameters table provides parameters suitable for every material that exists. It does, however, provide values that are suitable for a substantial number of materials.

The remaining steps define activities controlled by controller 20 software causing test unit 1 to machine and scan sample area 15 and then to display a relief or topographical map of the test results on display 23. In our preferred embodiment, controller 20 and display 23 take the form of a properly programmed personal computer (PC), perhaps with a printer for providing permanent images of the test results.

As is well known, PCs have the ability to execute software stored in their memories that can perform a wide variety of computational and executive activities. PCs also have I/O functions that allow them to provide commands to a variety of external devices and receive data from such devices. In the system of this invention, test unit 1 forms such an external device.

The process chart elements relating to controller 20 actions have only activity elements, such as element 58 and those following. Each activity element represents instructions whose execution causes controller 20 and test unit 1 to perform the stated functional step.

Activity element 58 causes test unit 1 to machine sample using the specified parameters. Usually, the path spacing will be somewhat smaller than the tip radius so that grooves 24 overlap. Selecting the proper parameters may be based on part of the resolution required to reveal the features within the sample area 15.

The instructions of activity element 62 cause controller 20 to scan tool tip 21a across the sample area 15 using the specified parameters and holding force constant. As tool 21 reaches each X-Y coordinate position on sample area 15, the Z-axis elevation is recorded along with the X, Y coordinate position. Execution then transfers through connector element A 63 to execute the instructions of activity element 65.

The instructions of activity element 65 convert the Z-axis elevation value to a gray scale intensity value. By gray scale here is meant that as elevation becomes higher (or lower) the pixel will be made proportionately darker to thereby provide a visual indication of the variations in elevation across sample area 15. The gray scale value may increase or decrease with increasing Z-axis elevation. The term "gray scale" here is intended to cover color variations as well as variations in intensity.

Activity element 68 maps the X and Y coordinates from sample area 15 at which the Z axis elevations were measured to X and Y coordinates in the image to be formed. Then activity element 72 forms the pixel gray scale levels in the X and Y image coordinates and displays this image in display element 23. Display element 23 will usually be a printer or PC display.

As a concrete example, grain structure is known to be in the range of around 1–10 µm for a tool steel material 11. We find that a machining depth of around 10 nm for such a material 11 will resolve detailed features of the grain structure. Several machining passes with Z-axis force of 100 µN using a tip 21*a* having a radius of curvature of 200 nm achieves this level of machining. A scanning step using a force of 10 µN with sampling intervals of 100 nm easily resolves even the smallest details of the grain structure.

The preceding describes an invention that we wish to protect with the claims that follow.

The invention claimed is:

1. A method useful for displaying variations in surface microstructural features for a selected sample area of a material sample comprising the steps of:
    a) selecting a machining tool having a tip with a preselected radius;
    b) machining the sample area by scribing a plurality of grooves over the selected area using the selected machining tool tip with a preselected substantially constant scribing force for at least a plurality of adjacent grooves; and
    c) scanning the selected machining tool tip across the selected area using a scanning force smaller than the scribing force, and providing a signal indicative of the tip elevation relative to a datum plane for a plurality of coordinate pairs within the selected area and said signal indicative of said surface microstructural features of said material sample.

2. The method of claim 1, wherein the machining step includes scribing a series of adjacent parallel grooves.

3. The method of claim 2, wherein the machining step includes the step of scribing a series of adjacent, overlapping, parallel grooves.

4. The method of claim 3, wherein the machining step includes the step of scribing a series of multiple grooves over the same part of the sample area.

5. The method of claim 4, wherein the scanning step includes applying a substantially constant force greater than zero to the machining tool tip.

6. The method of claim 5 wherein the scanning step force is no more than approximately one-tenth that of the scribing step.

7. The method of claim 6, wherein the scanning step tool tip force is at least approximately one-hundredth that of the scribing step.

8. The method of claim 5 wherein the scanning step tool tip force is of a level that causes removal of a negligible amount of material compared to the scribing step.

9. The method of claim 8, wherein the scanning step includes sampling a plurality of points in each of a plurality of equally spaced scanning paths.

10. The method of claim 9, wherein each of a plurality of consecutive sampling points occur at a predetermined horizontal displacement from the previous sampling point.

11. The method of claim 10, wherein the predetermined horizontal displacement at which sampling occurs is a function of the size of topographical features revealed in the selected area by the machining step.

12. The method of claim 10 the scanning step includes the step of sampling the vertical displacement of the tool tip at a plurality of adjacent sampling points spaced at approximately the displacement between adjacent scanning paths.

13. The method of claim 1, wherein the scanning step includes the step of moving the tool tip along a plurality of parallel and adjacent tracks.

14. The method of claim 1, including the step of generating a representation of tool tip elevation at each of the scanned horizontal tip positions on the selected area, using the sensed tool tip elevation at each coordinate pair.

15. The method of claim 14, wherein the representation of tool tip elevation at the coordinate pairs is a gray scale.

16. The method of claim 1, wherein the machining step includes a first phase using a preselected substantially constant large force on the scribe, followed by a second phase using a preselected substantially constant small force on the scribe.

17. The method of claim 16, wherein the machining step first phase uses a preselected constant first force, and the second phase uses a preselected constant second force no more than about 25% of the preselected first force.

18. The method of claim 17, wherein the machining step first phase includes at least one pass using a preselected constant first force, and wherein the second phase includes at least one pass using a preselected constant second force of about 10% of the preselected first force.

19. The method of claim 16, wherein the scanning step includes applying to the machining tool tip a substantially constant force greater than zero and substantially smaller than the smallest force applied to the machining tool tip during the machining step.

20. The method of claim 1, wherein the scanning step includes applying to the machining tool tip a substantially constant force greater than zero and substantially smaller than the smallest force applied to the machining tool tip during the machining step.

21. The method of claim 1, wherein the machining step includes mounting the machining tool tip on a carrier having low X-Y compliance.

* * * * *